United States Patent [19]
Tomita

[11] Patent Number: 5,894,122
[45] Date of Patent: Apr. 13, 1999

[54] SCANNING NEAR FIELD OPTICAL MICROSCOPE

[75] Inventor: Eisuke Tomita, Chiba, Japan

[73] Assignee: Seiko Instruments Inc., Japan

[21] Appl. No.: 08/815,816

[22] Filed: Mar. 12, 1997

[30] Foreign Application Priority Data

Mar. 13, 1996 [JP] Japan ................................ 8-056585

[51] Int. Cl.[6] ................................................ H01J 3/14
[52] U.S. Cl. ................................ 250/234; 250/306
[58] Field of Search .................. 250/234, 216, 250/306, 461.1; 359/368

[56] References Cited

U.S. PATENT DOCUMENTS

| | | | |
|---|---|---|---|
| 4,947,034 | 8/1990 | Wickramasinghe et al. | 250/216 |
| 5,294,790 | 3/1994 | Ohta et al. | 250/306 |
| 5,304,795 | 4/1994 | Fujihira et al. | 250/234 |

FOREIGN PATENT DOCUMENTS

535611 A1  4/1993  European Pat. Off. .

WO 9004753  5/1990  WIPO .

OTHER PUBLICATIONS

Optical Society of America, *Optics Letters*, vol. 19, No. 3, Feb. 1, 1994, Yasushi Inouye et al., "Near–field Scanning Optical Microscope with a Metallic Probe Tip".

*Primary Examiner*—Stephone B. Allen
*Attorney, Agent, or Firm*—Adams & Wilks

[57] ABSTRACT

A high resolution observation apparatus capable of resolving details smaller than the wavelength of a laser beam used for detection includes a probe for scattering evanescent light projected from a sample in response to the incident laser light. The scattered evanescent light is detected by a photodetector located proximate the probe tip. During measurements, the position of the probe is controlled in the Z axis by a fine movement mechanism while being scanned in the XY plane to conduct measurements. The distance between the probe and the sample is maintained constant by use of a Z-axis servo circuit responsive to an output signal of the photodetector for producing a control signal to control the fine movement mechanism to maintain the detected evanescent light constant. A three-dimensional display of an output of the servo circuit is provided.

44 Claims, 7 Drawing Sheets

SCANNING NEAR FIELD OPTICAL MICROSCOPE

BACKGROUND) OF THE INVENTION

The present invention relates to a scanning near field optical microscope having an optical resolution which is less than the given wavelength of a detection light used for measurement. Further, the present invention relates to a scanning near field optical microscope for measuring a locally excited luminescence measurement of semiconductor devices in a high resolution of less than the given wavelength.

So-called near field scanning optical microscope is known as an optical microscope having an optical resolution of less than the given wavelength. For example of this microscope, a photon scanning tunneling microscope is described in Japanese Open Pat. H03-91710 "Photon scanning tunneling microscope" Motoichi Ohtsu. A near field scanning optical microscope is described in Japanese Open Pat. H04-291310, entitled "Near field scanning optical microscope and applications thereof" of Robert Eric Betzig and Japanese Open Pat. H06-50750 entitled "Scanningmicroscope comprising force-sensing means" of Robert Eric Betzig. In addition, a scanning optical microscope using a metallic probe tip is described in Yasushi Inoue, et al., "Scanning optical microscope that uses a metallic probe tip", Near Field optics Research Group, the first research forumproceedings pp. 41–46, and Yasushi Inoue, et al., "Near field scanning optical microscope of reflection mode using a metallic probe tip", Near Field optics Research Group, the fourth research forum proceedings pp. 53–58. Those devices will be summarized below.

Figure 2:
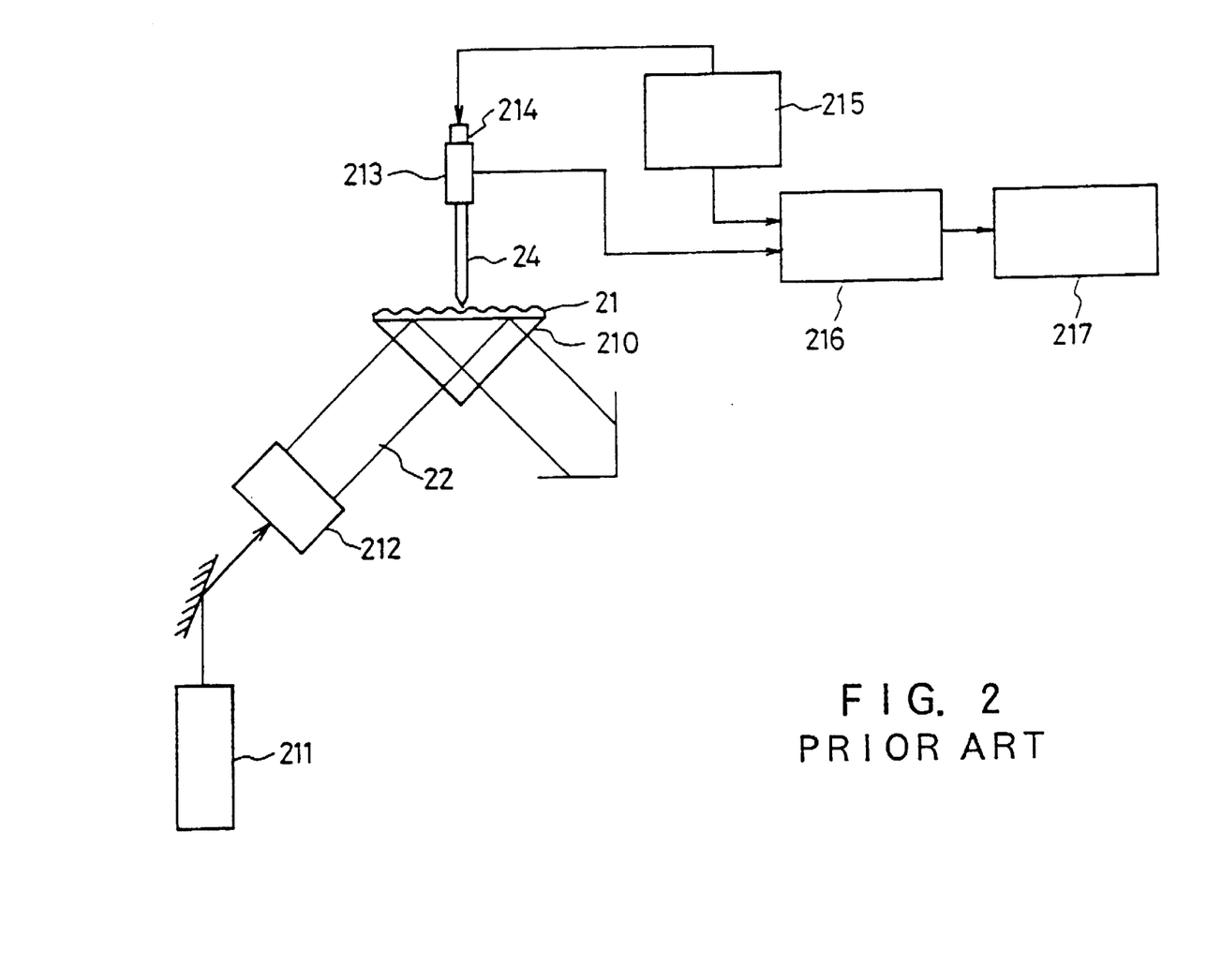
FIG. 2 is a schematic view showing the prior photon scanning tunneling microscope.

A photon scanning tunneling microscope is also called a photon STM. FIG. 2 is a schematic view of the prior photon scanning tunneling microscope. A laser light emitted from laser 211 is converted to parallel rays in beam expander 212. The laser light comes in total internal reflection angle to prism 210 which sample 21 is set on as shown in FIG. 2. An evanescent wave occurring on the sample surface when light is reflected totally at the inside of sample 21 is picked up by dielectric probe 24, and photomultiplier tube 213 detects the evanescent wave. The distance between the sample surface and the dielectric probe 24 is controlled using a piezoelectric element so as to keep the detected light-intensity constant. A picture image of constant evanescent light intensity is gained by raster-scanning the sample surface using X-Y driving stage 214. The measured image reflects a shape of the sample surface which is optically uniform because the evanescent light exists only on the sample surface and attenuates rapidly according to the distance. Such an image producing principle is similar to the principle of a scanning tunneling microscope (STM.) The STM is a microscope which replaces evanescent light with a tunneling current. The resolution of the photon STM depends on area of optically coupled domain at the dielectric probe tip as made clear by the above description. As a probe having a radius (for example, less than 50 nm) at the tip which is less than laser light wavelength (for example, about 500 nm) is made easily by a chemical etching, a microscope having high resolution of less than the given wavelength can be realized.

Figure 3:
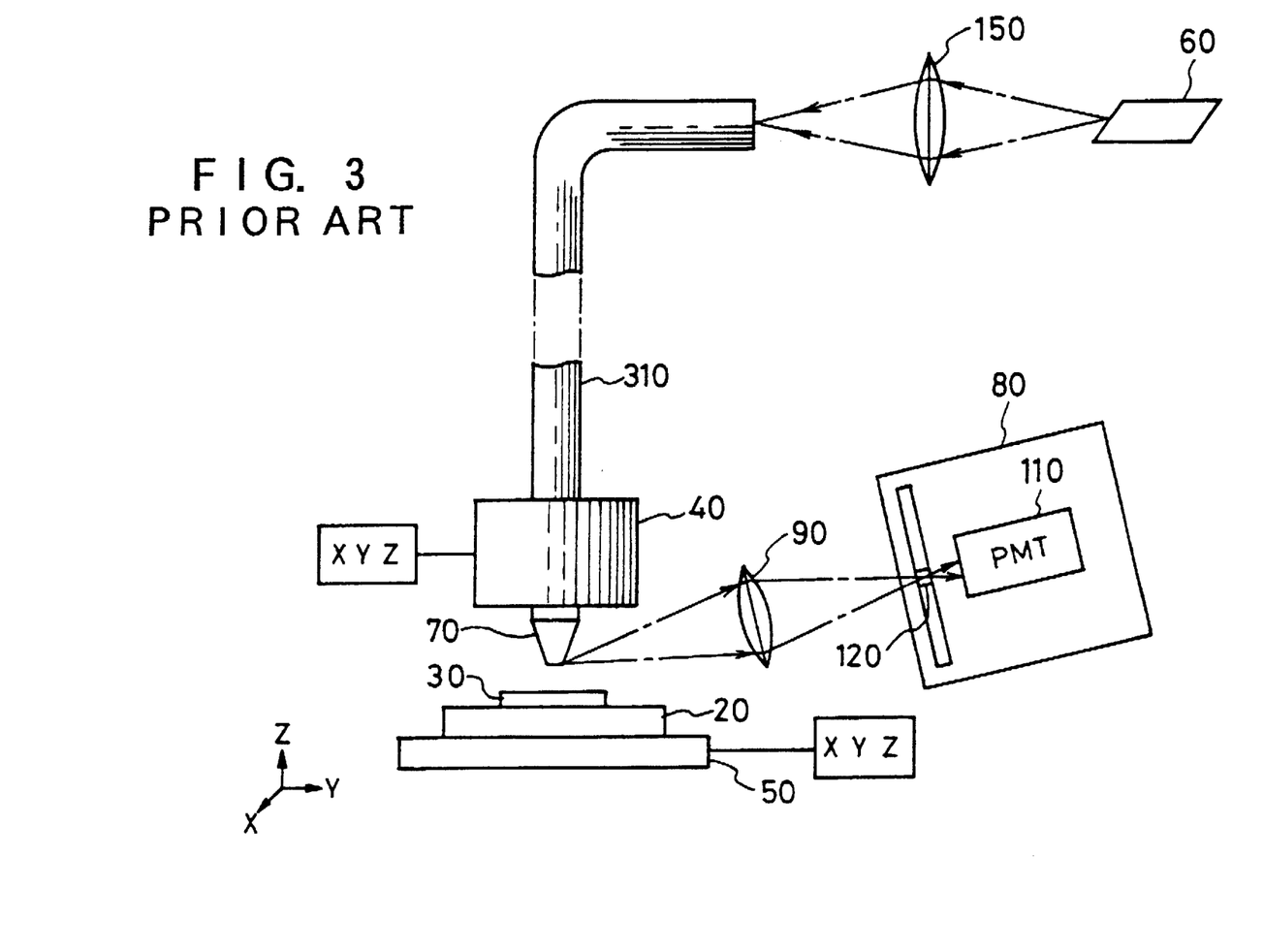
FIG. 3 is a schematic view showing the prior near field scanning optical microscope.

A near field scanning optical microscope is also called NSOM. FIG. 3 is a schematic view of the prior near field scanning optical microscope. The optical fiber probe 310 is formed with a tapered tip 70. At the tapered probe tip, an aperture is formed, the size of which is less than the given wavelength. Sample holder 20 is set on XYZ stage 50. On sample holder 20, sample 30is set. The probe comes close to the sample surface using an XYZ fine displacement element, keeps the distance constant, and raster-scans the sample surface. Optical fiber probe 70 vibrates in parallel to the sample surface using fine displacement element 40. Lateral force from the:sample surface, that is shear force, acts at the probe tip, and the vibration condition of the probe changes. For the measurement of vibration condition of probe 70, irradiating the tip portion with a laser light for position control (not shown in FIG. 3), a shadow of probe 70 is detected by lens 90 and photodetector 80. The distance between the sample surface and the probe tip is controlled using fine displacement element 40 so that shear force is kept constant, namely, change of amplitude or phase is kept constant. As shear force attenuates rapidly according to the distance, the distance between the sample surface and the probe tip is controlled so as to be constant. In this condition, laser light 60 is guided to fiber 310 using lens 150, and irradiates the sample surface from the aperture of tip. A part of reflecting light or transmitted light is detected by the prior optical system (not shown in FIG. 3) As above-mentioned, the resolution of NSOM depends on aperture size of the tip. As it is easy to process an aperture of less than the wavelength (for example, less than 50 nm), a microscope having high resolution of less than the given wavelength can be realized.

Figure 4:
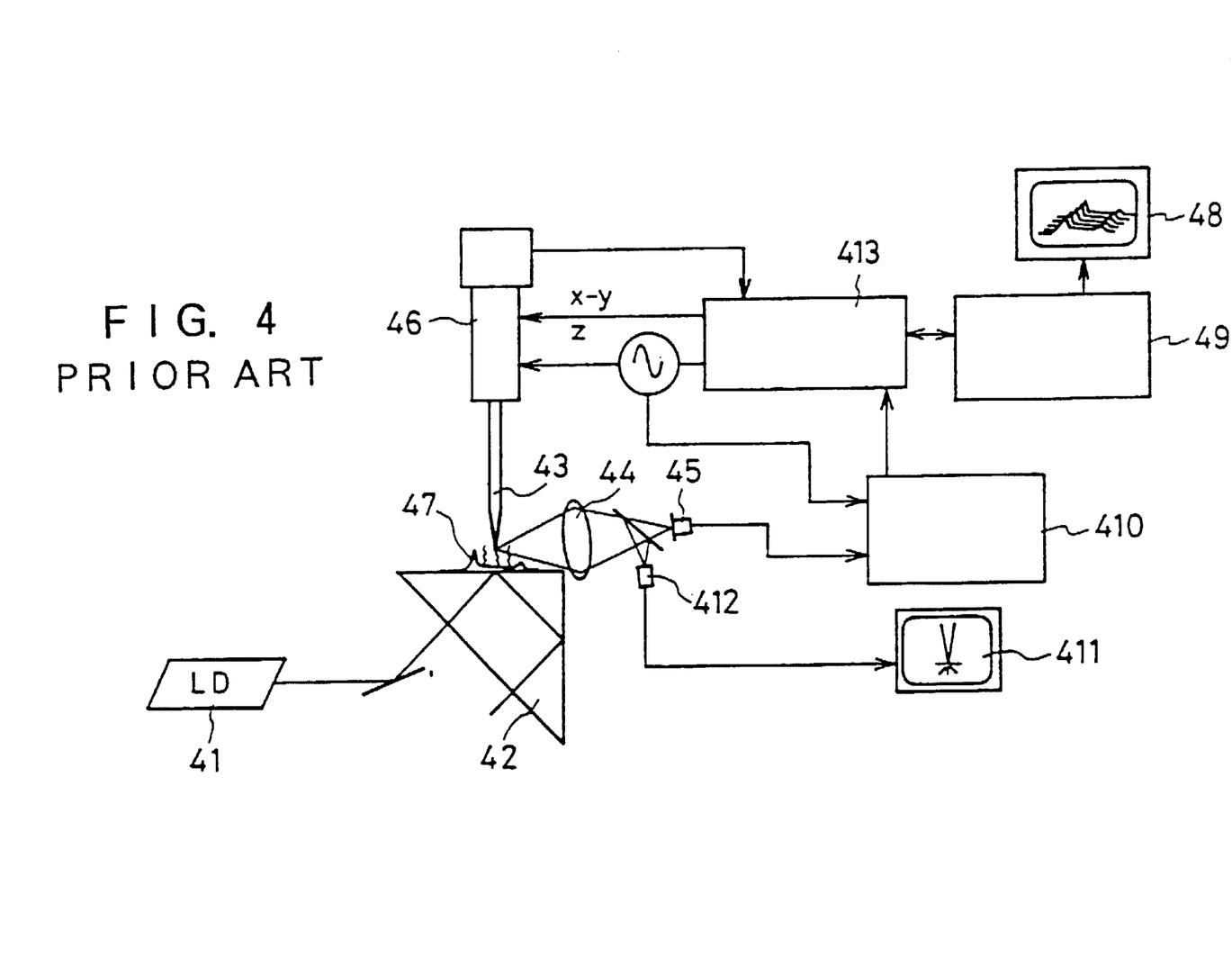
FIG. 4. is a schematic view showing the prior scanning optical microscope using the metallic probe tip.

FIG. 4 is a schematic view of the prior scanning optical microscope using a metallic probe tip In FIG. 4, 41 is a laser diode; 42 is a prism; 43 is a metal probe; 44 is a lens; 45 is a photomultiplier tube; 46 is a XYZ fine displacement stage; 47 is a sample; 48 is a display; 49 is a personal computer; 413 is an STM controller; 410 is a lock-in amplifier; 411 is a monitor; 412 is a CCD camera. A laser light emitted from the laser diode 41 is guided to prism 42, and the rear of sample 47 is irradiated by the laser light of total reflection angle. The evanescent light of sample surface is scattered by metal probe 43. The light scattered at the probe tip is detected by lens 44 and photomultiplier tube (PMT) 45. For control of distance between the sample surface and the metal probe tip, a distance dependency of evanescent light or a tunnel current is used. Namely, distance between the sample surface and the metal probe tip is controlled using XYZ fine displacement stage 46 so as to keep tunnel current constant, or keep the detected evanescent light intensity constant. Resolution of the scanning optical microscope using a metallic probe depends on size of a light scattering region of metal probe tip. As a metal probe having a tip radius of less than the given wavelength (for example, less than 50 nm) is made easily by a chemical etching, a microscope having a high resolution of less than the wavelength can be realized because of that.

In the prior near field scanning optical microscope, there are faults such as those mentioned below. In a photon scanning tunneling microscope (photon STM), an evanescent light picked up using a dielectric probe is weak, and it is difficult to control the distance between the sample and the probe. As only transmitted light can be used, for example, it is impossible to measure an excited luminescence of semiconductor devices. Namely, when using visible radiation (for example, laser light of 633 nm wavelength), the sample is excited and visible radiation or near infrared radiation (for example, about 800 nm) from the sample is detected, it is impossible to irradiate from the rear of sample surface and to emit the evanescent light at the sample surface, because the visible radiation can not be transmitted through the semiconductor. In a near field scanning optical microscope (NSOM), resolution of less than the vibration amplitude (about 10 nm) can not be gained because of making the optical fiber probe vibrate in parallel to the sample surface. For detecting the shear force, the laser light is irradiated to the sample surface near probe tip, and a probe tip image (shadow) in the reflecting light is detected. Because of that, the reflecting light intensity is easily influenced by the shape and reflectance of the sample surface, and it is difficult to measure accurately vibration amplitude. Also, it is not easy to position the laser light. Because of that, there is a fault in repeatability of data. As a laser light for detecting shear force, except the exciting light from the probe, is irradiated to measuring region, background noise increases, and it is difficult to remove noise.

In a scanning optical microscope using a metallic probe, it is impossible to irradiate an exciting light locally to the sample surface from a probe tip because a metal probe is used only for a scatterer. As the whole of sample is irradiated background noise by emission at regions other than the measuring region or scattered light increases, and it is difficult to remove noise. When a semiconductor is measured, conductivity decreases by contamination of the surface, and non-operation occurs easily.

SUMMARY OF THE INVENTION

The scanning near field optical microscope of the present invention comprises a probe such as an optical waveguide probe having a small aperture portion at the probe tip, the diameter of which is less than the given wavelength; an evanescent light emitting means comprising a laser light source, a lens, and a prism; a coarse displacement means for taking the optical waveguide probe close to a sample surface; an evanescent light detecting means comprising a lens and a photodetector; means for controlling a distance between the sample and the probe in a first direction comprising a Z axis fine displacement element and a Z servo-circuit; a two dimensional scanning means for causing relative scanning movement between the probe and the sample in a plane perpendicular to the first direction comprising a XY fine displacement element and a XY scanning circuit; and a data processing means for providing an image of a measured signal in three dimensions. By this construction, a scanning near field optical microscope is provided, which has high resolution of less than a given wavelength and can measure excited luminescence locally.

DETAILED DESCRIPTION OF THE INVENTION

Figure 1:
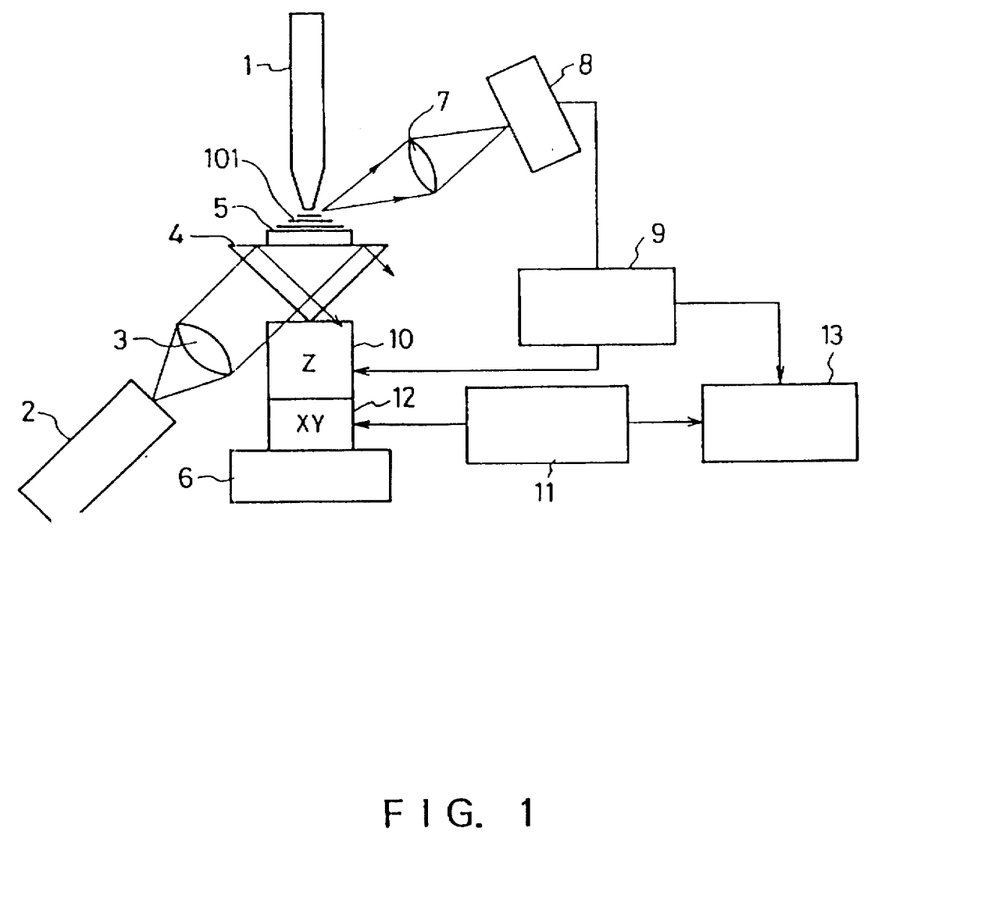
FIG. 1 is a schematic view showing the scanning near field optical microscope of the present invention.

FIG. 1 is a schematic view of the scanning near field optical microscope of the present invention.

The scanning near field optical microscope of the present invention comprises optical waveguide probe 1 having a small aperture portion at the probe tip, the diameter of which is less than a given wavelength; the evanescent light emitting means comprising laser light source 2, lens 3, and an optical device comprising a prism 4; coarse displacement means 6 for taking the optical waveguide probe 1 close to a sample surface; the evanescent light detecting means comprising lens 7 and photodetector 8; the means for controlling the distance between the sample and the probe comprising Z axis fine displacement element 10 and Z servo-circuit 9; two dimensional scanning means comprising XY fine displacement element 12 and XY scanning circuit 11; and data processing means 13 for providing an image of the measured signal in three dimensions.

Taking the optical waveguide probe 1 close to near the sample surface, a evanescent wave is scattered at the probe tip and scattered by the probe 1. The scattered light is collected and detected by the photodetector 8. Controlling the distance between the sample and the probe 1 so as to keep scattered light intensity constant, the probe tip is kept at a constant distance from the sample surface. In this condition, the light from the second light source, the wavelength of which is different from the former, is guided, and irradiates a partial region of the sample surface from the aperture of optical probe tip or picks up the light from the sample using the optical probe. The optical probe is scanned in two dimensions relatively on the sample surface, and that realizes three dimensional image. As noted above, by controlling the distance between the optical waveguide probe 1 and the sample using evanescent wave, lateral vibration like that used in a near field scanning optical microscope (NSOM) in not necessary, and that prevents decrease of in-plane resolution associated with such vibration. Positioning of the laser for the probe position control in also not necessary, and repeatability of data improves. Because the scattering of evanescent wave occurs at the probe tip, there is not any stray light from a region except measuring region, and background noise can be decreased. Although detected light is weak in a photon scanning tunneling microscope (photon STM) because the evanescent light is picked up by the dielectric probe, detected light intensity can be increased by using the scattered light of evanescent light. Although the light can not be irradiated locally to the sample surface from the probe tip in a scanning optical microscope using a metal probe or photon scanning tunneling microscope, it is possible in the present invention to irradiate the light locally to the sample surface from the probe tip because of use of the optical waveguide probe. Non-operation by contamination of the surface does not occur, because tunneling current is not used. Thus, high resolution, locally light irradiation, and high repeatability of measured data become possible, which are impossible in the prior art.

Embodiments of the Invention

Embodiments of the invention will be described below.

|Embodiment 1|

Figure 5:
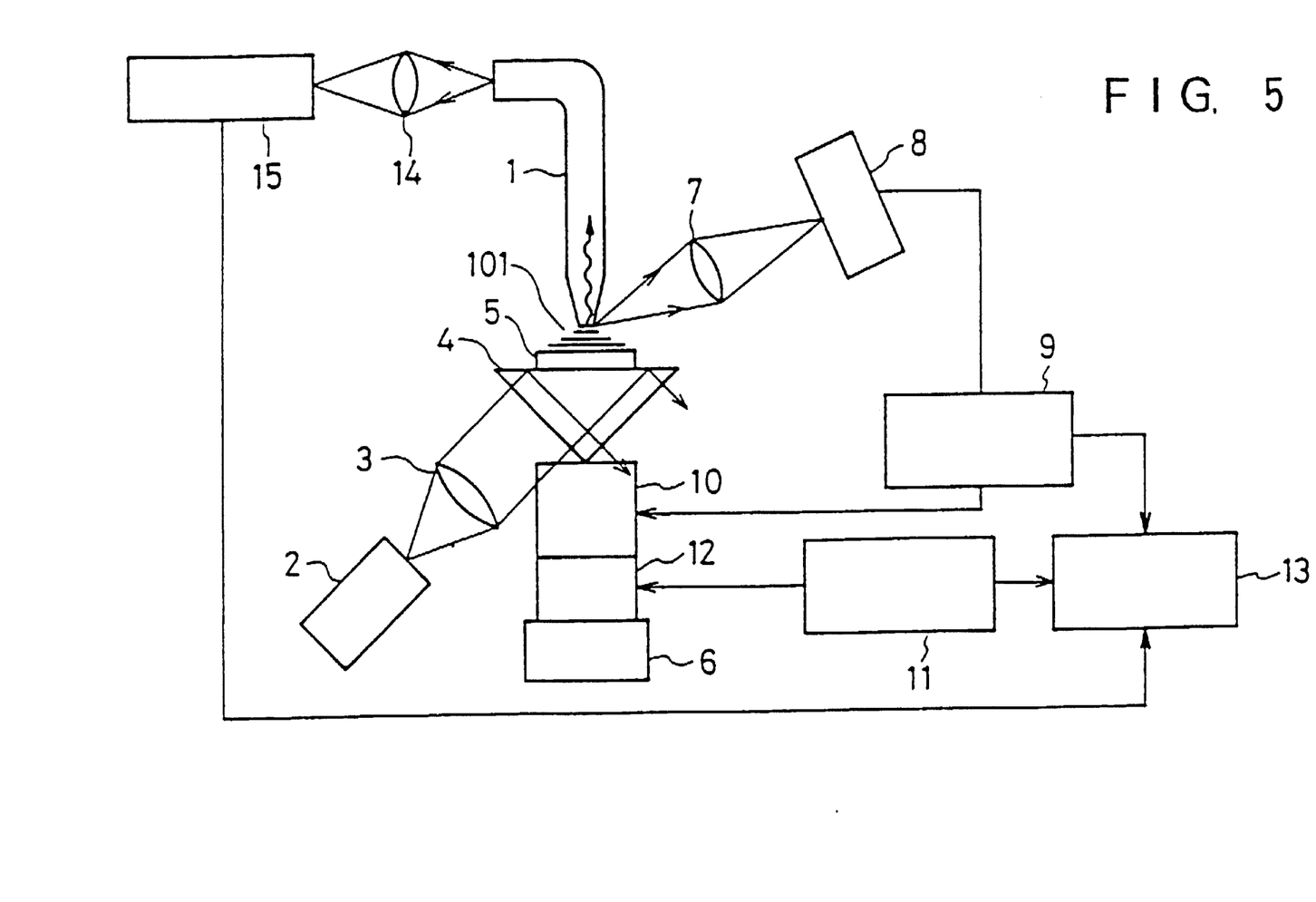
FIG. 5 is a schematic view showing Embodiment 1 of the scanning near field optical microscope of the present invention.

FIG. 5 is a schematic view of embodiment 1 of the scanning near field optical microscope in the present invention.

A slide glass is set through matching oil on quartz prism 4. Thin film sample 5 sticks on the slide glass. An inorganic thin film like semiconductor thin film, a biosample, and an organic thin film are set as a sample. As how to make a sample, for example, a vacuum evaporation, a method expanding fine grain sample dispersed by volatile solvent on a glass plane, and a CVD method maybe used. A light emitting element thin film formed on a glass is used as a sample in embodiment 1. The light emitting element emits light by being excited by an externally-applied electric field, current, or magnetic field. A red light emitting diode of 700 nm wavelength is used as a light emitting element. Besides that, visible light, for example, blue or green light emitting elements and infrared light emitting element are able to be used.

Semiconductor laser 2 of 830 nm wavelength is used as a laser. For the wavelength of the laser, visible light laser, for example, argon ion laser of 488 nm wavelength, also is possible to use, and infrared laser, for example, a semiconductor laser of 1.3 μm wavelength, also possible to use. These are included in the present invention. The laser light is converted into parallel light by lens 3. A single lens, cylindrical lens, and combined lens may be used as a lens. A laser light coming in prism 4 comes with a 45 degree angle of incidence to the rear of sample. The laser light reflected totally at the rear of sample goes out of the prism. At that time, evanescent light 101 emits.

The angle of incidence of a laser light is not always 45 degree, but totally reflecting angle of more than that may be available. Both are included in the present invention because of emission of the evanescent wave. Evanescent light 101 shows strong distance dependency, and decreases in the form of an exponential function with a increase in distance from the sample surface. A measurement example of distance dependency of evanescent light 101 is described in Motoichi Ohtsu, "Photon scanning tunneling microscope", O plus E, May (1991) pp. 90–97.

Optical waveguide probe 1 comes close to the sample surface 5 using coarse displacement means 6. An optical probe is used, in which single mode optical fiber is etched chemically, and tapered. After that, a aluminum thin film is formed at taper portion except the aperture portion of the tip. As an optical waveguide probe, a multi-mode optical fiber and tapered glass pipet are included in the present invention. In the tapering process, mechanical polishing and heat drawing, except chemical etching, are included in the present invention. In a metal thin film coating, except aluminum, noble metals such as gold and platinum, multi-layer film, and alloy thin film are included in the present invention. The size of the aperture is formed to be less than the wavelength of light used for measurement. An aperture of less than 100 nm is formed in the present invention. The size of aperture is desirable to be large, that is 150–300 nm, for more light intensity. On the other hand, for higher resolution, the size is desirable to be 20–50 nm. Thus, the size range of 20–300 nm is included in the present invention. As coarse displacement means 6, Z stage is used, which comprises a pulse motor, a reduction gear, a coarse motion screw, and a body. For the Z stage, a stage using a piezoelectric element, for example, inch worm mechanism and a stage combined with a Z stage and piezo-electric element are also included in the present invention.

The evanescent light scattered by optical waveguide probe 1 is collected by lens 7, and detected by photodetector 8. A single lens, a combined lens and the like are included in the present invention. A silicon photo-diode detector is used for the photodetector 8. As the photodetector, however, a photomultiplier tube, a germanium detector, and a compound semiconductor detector may also be used in the present invention. Output of photodetector 8 is input to Z servo circuit 9. In Z servo circuit 9 generates driving voltage of Z axis fine displacement element 10 according to the strength of evanescent light. The distance between the optical waveguide probe tip and the sample surface is always kept constant because a Z axis fine displacement element operates so that the strength of evanescent light become constant. A cylindrical piezo-electrical element in which three axes scanner of XYZ is united is used as Z axis fine displacement element 10. As a fine displacement element, besides that, a piezo-scanner only for Z axis and an electrostrictive element are included in the present invention.

Optical waveguide probe 1 is scanned in two dimensions at the sample surface 5 using XY fine displacement element 12 and XY scanning circuit 11. Above-mentioned cylindrical piezo-scanner is used as an XY fine displacement element. As the XY fine displacement element, besides that, a piezo-stage, a stage having a parallel spring, and tri-pod type piezo-electric element are within the scope of the present invention. In data processing means 13, a contour of constant evanescent light intensity, that is, the sample surface, is pictured in three dimensions on the basis of the scanning signal of XY scanning circuit 11 and Z signal of Z servo circuit 9.

Emission of sample 5 is pickedup by optical waveguide probe 1. The light picked up is collected and detected by photodetector 15. A photomultiplier tube is used as the photodetector. As the photodetector, besides that, silicon-diode and germanium detector may be used in the present invention. The signal of photodetector 15 is input to data processing means 13 and pictured in three dimensions using the scanning signal of XY scanning circuit 11. A computer and CRT display are used as data processing means 13. As the data processing means, besides that, a storage oscilloscope, a combination of computer and liquid crystal display, and various kinds of method are included in the present invention. Thus, luminescence distribution of the sample surface can be detected in high resolution of less than the given wavelength by controlling the distance using the evanescent light and detecting luminescence of sample using the optical waveguide probe.

[Embodiment 2]

Figure 6:
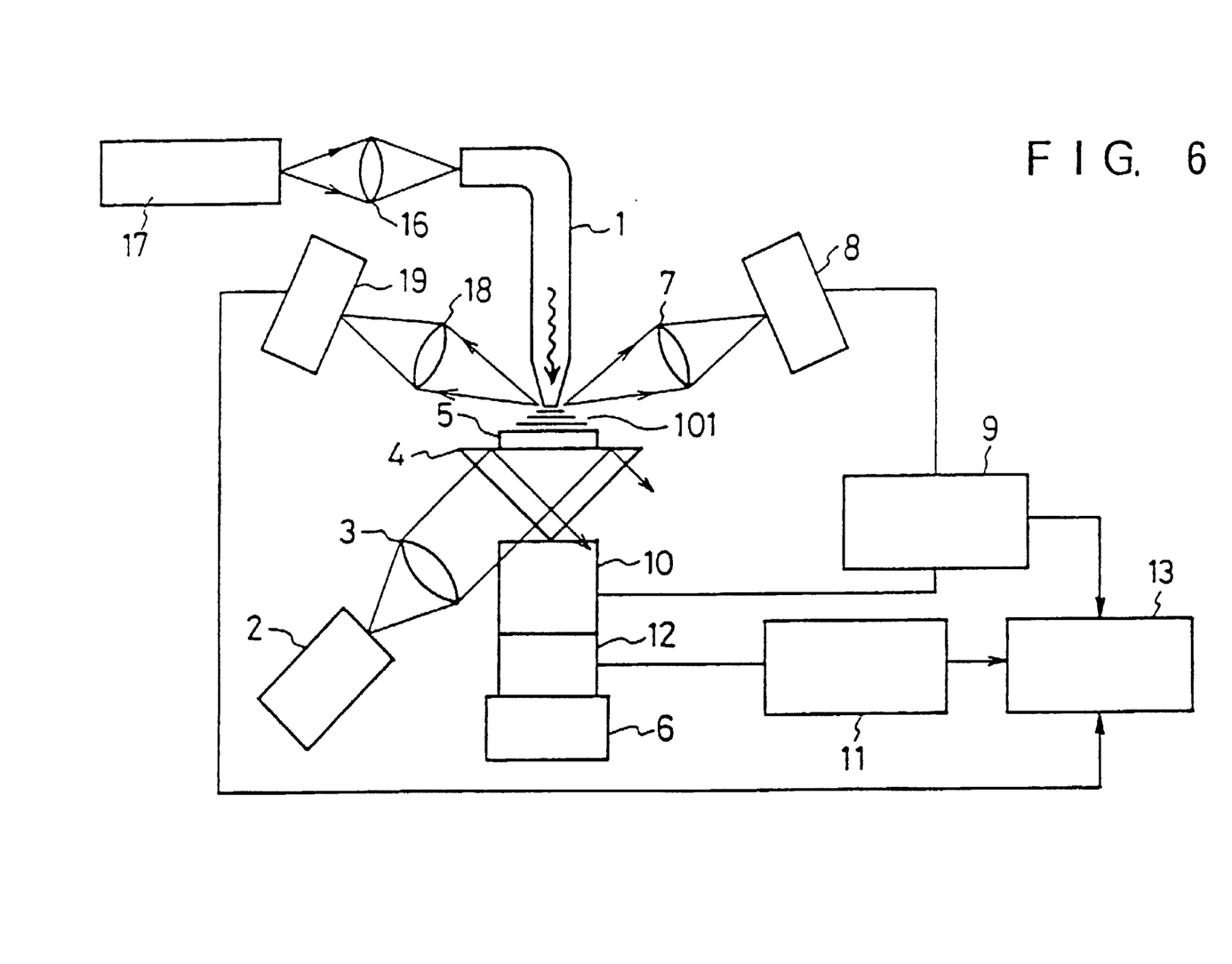
FIG. 6 is a schematic view showing Embodiment 2 of the scanning near field optical microscope of the present invention.

FIG. 6 is a schematic view of Embodiment 2 of scanning near field optical microscope in the present invention.

Evanescent light 101 is emitted on sample 5 using laser lens 3, and prism 4. As laser 2, infrared light laser of 1.3 μm is used. As sample 5, PN junction of gallium arsenic is used. The infrared light laser of 1.3 μm transmits gallium arsenic. Single mode optical fiber probe 1 comes close to the sample surface using coarse displacement means 6. Probe 1 is metal-coated except for its aperture, and lets evanescent light scatter. Evanescent light 101 is collected by lens 7, and detected by germanium diode 8. As photodetector B, besides germanium, an infrared light detecting element like a compound semiconductor may be used in the present invention. The distance between probe 1 and sample 5 is controlled by XYZ three axis piezo-scanners 10 and 12.

The laser light emitted from laser light source 17 is collected by lens 16 and guided to optical fiber probe 1. The laser light is emitted from the aperture of tip of probe 1 and irradiates the sample. As laser light source 17, helium neon laser of 633 nm wave length is used. Sample 5 is excited by laser light 17 and emits luminescence by so-called photo luminescent phenomenon. Luminescence occurs only near the aperture of probe 1. The light is collected by lens 18 and detected by avalanche photo diode 19. The data of detector 19 is pictured by data processing means 13. The distribution of photo luminescent light of sample 5 can be measured in high resolution of less than the given wavelength XY-scanning by use of piezo-scanners 10 and 12.

[Embodiment 3]

Figure 7:
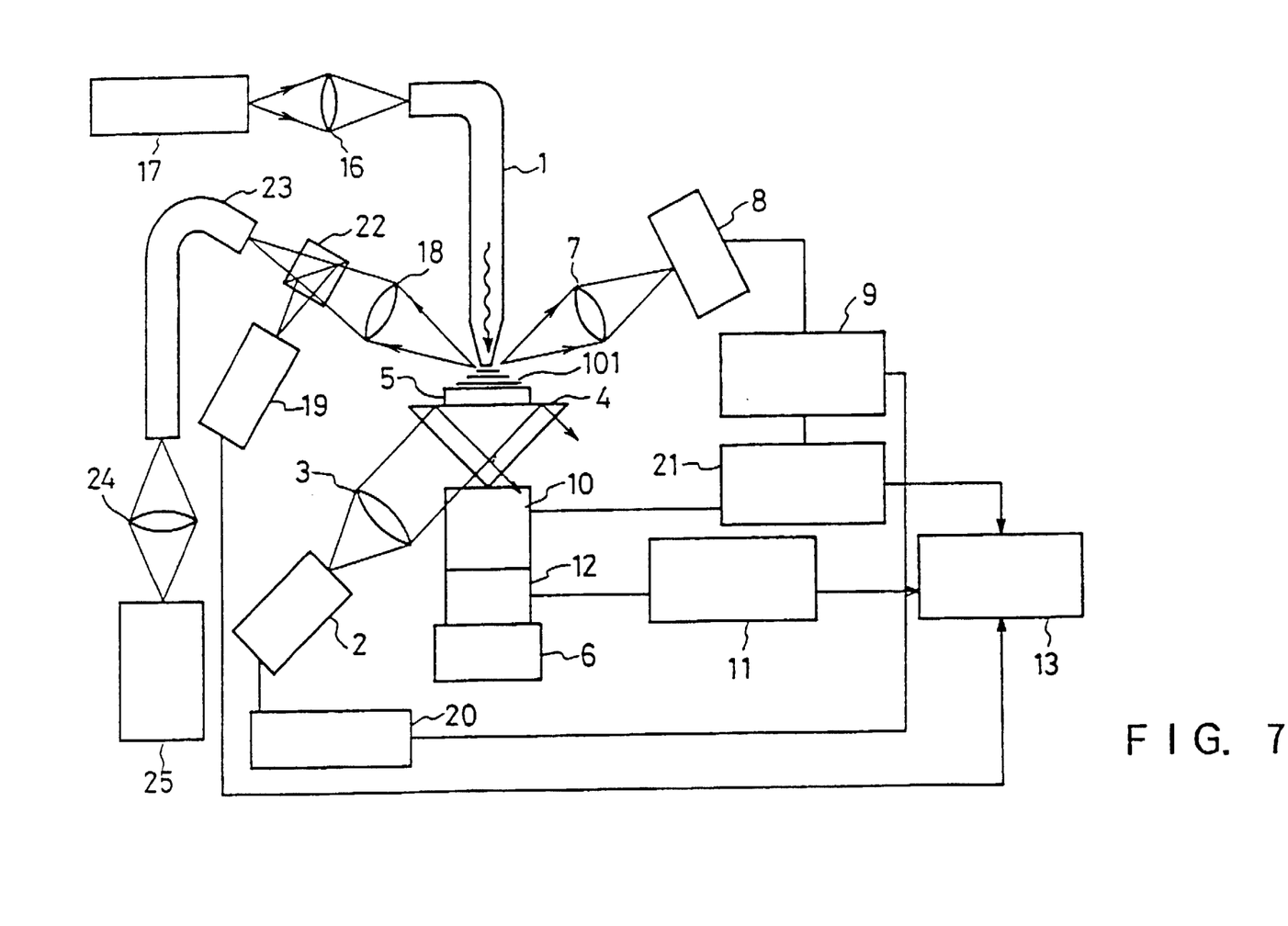
FIG. 7 is a schematic view showing Embodiment 3 of the scanning near field optical microscope of the present invention.

FIG. 7 is a schematic view of Embodiment 3 of the scanning near field optical microscope in the present invention.

Function generator 20 for light modulation and lock-in amplifier 21 are added to the constitution of embodiment 2. The light of semiconductor laser 2 is modulated and lock-in-detected. Thus, by measuring evanescent light 101 in a high S/N ratio, the position of probe 1 is controlled accurately. Photo luminescent light is divided to photodetector 19 and optical waveguide fiber 23 by half mirror 22 after being collected with lens 18 The light emitted from the optical waveguide fiber 23 is collected and guided to spectroscope 25. In that way, a spectral analysis is carried out. Thus, it becomes possible to analyze the spectrum of photo luminescent light of local region in sample 5, which is less than the given wavelength.

As described above the scanning near field optical microscope of the present invention comprises optical waveguide probe having a small aperture portion at the probe tip, the diameter of which is less than a given wavelength; evanescent light emitting means comprising a laser light source, a lens, and a prism; coarse displacement means for taking the optical waveguide probe close to a sample surface; evanescent light detecting means comprising a lens and a photodetector; means for controlling the distance between the sample and the probe comprising Z axis fine displacement element and Z servo-circuit; two dimensional scanning means comprising XY fine displacement element and XY scanning circuit; and data processing means for producing an image of the measured signal in three dimensions.

By controlling the distance between optical waveguide probe and sample using the evanescent wave in this manner, lateral vibration of the probe like that in a near field scanning optical microscope (NSOM) is not necessary, and the present invention prevents the resolution from decreasing. The use of a laser for probe position control is also not necessary, and repeatability of data improves. Because scattering of the evanescent wave occurs only at the probe tip, there is no stray light except that from measuring region, and background noise can be decreased. Although the detected light is weak in photon scanning tunneling microscope (photon STM), the detected light intensity can be increased by using the scattered light of evanescent light. Although the scanning optical microscope using the metallic probe tip and photon scanning tunneling microscope can not irradiate light locally to the sample surface from the probe tip, it is possible to irradiate light locally to the sample surface from the probe tip in the present invention because of using optical waveguide probe. No-operation by contamination of the surface does not occur because of not using tunnel current. Thus, high resolution, locally light irradiation, and high repeatability of measuring data becomes possible, which are impossible in the prior art. Using the scanning near field optical microscope in the present invention, for example, light spectrum of photo luminescent light of semiconductor and spectral analysis are carried out in resolution of less than the given wavelength which are difficult in the prior art.

What is claimed is:

1. A scanning near field optical microscope comprising:

an optical waveguide probe having a sharpened tip portion provided with a small aperture at the tip portion;

light emitting means for emitting a light to irradiate a sample so that an evanescent light is projected by the sample and scattered by the probe tip, the light emitting means comprising a laser light source, a lens, and a prism;

coarse displacement means for moving one of the optical waveguide probe and the sample to bring the optical waveguide probe close to a surface of the sample;

evanescent light detecting means comprising a lens for collecting the evanescent light projected by the sample and scattered by the probe tip, and a photodetector for detecting the collected evanescent light and producing a corresponding output signal;

means for controlling a distance between the sample and the probe tip comprising a Z axis fine displacement element for moving one of the probe and the sample in response to a control signal, and a Z servo-circuit for receiving the output signal of the photodetector and generating the control signal to control the Z axis fine displacement element so as to control the distance between the probe tip and the sample to maintain the intensity of the detected evanescent light constant;

scanning means for causing relative scanning motion between the probe and the sample in two dimensions, comprising an XY fine displacement element and an XY scanning circuit; and data processing means for providing an image of a measured characteristic of the sample in three dimensions on the basis of outputs of at least the Z servo-circuit and the XY scanning circuit.

2. A scanning near field optical microscope according to claim 1; wherein the optical waveguide probe comprises a single mode optical fiber coated with a metal at the sharpened tip portion thereof except at the aperture, and the diameter of the aperture is smaller than a wavelength of the light emitted by the light emitting means.

3. A scanning near field optical microscope according to claim 1; wherein the laser light source comprises an infrared laser, and the photodetector comprises an infrared light detecting element.

4. A scanning near field optical microscope according to claim 1; further comprising means for modulating a laser light periodically and a lock-in detecting means.

5. A scanning near field optical microscope according to claim 1; further comprising light detecting means for detecting a light projected by the sample and picked up by the optical waveguide probe.

6. A scanning near field optical microscope according to claim 1; further comprising a second laser light source for producing a second laser light which is guided in the optical waveguide probe and which irradiates the sample.

7. A scanning near field optical microscope according to claim 6; further comprising light detecting means for detecting light reflected by the sample in response to light irradiated onto the sample from the tip of the optical waveguide probe.

8. A scanning near field optical microscope according to claim 6; further comprising light detecting means for detecting luminescence emitted from the sample in response to the light irradiated onto the sample from the tip of the optical waveguide probe.

9. A scanning near field optical microscope according to claim 8; further comprising means for analyzing the spectrum of luminescence emission from the sample.

10. A high resolution observation apparatus comprising: a light emitting source for emitting an incident light to be incident on a sample so that an evanescent light is projected from the sample in response to the incident light; a probe disposed proximate a surface of the sample and having a narrow tip for scattering the evanescent light projected by the sample; an evanescent light detector disposed proximate the probe tip for detecting the evanescent light scattered by the probe tip and outputting a corresponding signal; a position control system responsive to a control signal for supporting and moving at least one of the probe and the sample in a first direction to control the distance therebetween in the first direction and for causing relative scanning movement therebetween in a plane perpendicular to the first direction; and a servo circuit responsive to the output signal of the light detector for producing the control signal to control the position control system to maintain the detected evanescent light constant.

11. A high resolution observation apparatus according to claim 10; wherein the incident light has a predetermined wavelength and is incident on the sample at a total reflection angle.

12. A high resolution observation apparatus according to claim 10; further comprising an optical device on which the sample is disposed.

13. A high resolution observation apparatus according to claim 12; wherein the optical device is an optical prism made of a transparent material and having a flat first surface on which the sample is disposed.

14. A high resolution observation apparatus according to claim 13; wherein the incident light is a laser light and is incident on a second surface of the prism at a total reflection angle.

15. A high resolution observation apparatus according to claim 10; wherein the probe tip is formed with an aperture portion having a diameter smaller than a wavelength of the incident light.

16. A high resolution observation apparatus according to claim 10; wherein the probe comprises an optical waveguide probe made of an optical fiber having a sharpened tip coated with a metal and having an aperture at the tip portion at which no metal is coated, the aperture having a diameter smaller than a wavelength of the incident light.

17. A high resolution observation apparatus according to claim 10; wherein the position control system comprises a coarse position adjustment mechanism for moving one of the probe and the sample in the first direction to bring the probe close to the sample so that the evanescent light is scattered by the probe tip, a fine movement element comprising a piezoelectric element capable of extending and retracting one of the probe and the sample in the first direction in response to the control signal generated by the servo circuit so as to control the distance between the probe tip and the sample in the first direction to maintain the detected evanescent light constant.

18. A high resolution observation apparatus according to claim 10; further comprising data processing means for producing a three-dimensional image of a measured characteristic of the sample based on outputs of the servo circuit and the position control system when the probe is scanned relative to the sample.

19. A high resolution observation apparatus according to claim 10; wherein the light emitting source comprises a laser source for projecting a laser light, and a lens onto which the laser light is projected for directing the laser light onto the sample.

20. A high resolution observation apparatus according to claim 19; wherein the laser is one of an argon laser, a semiconductor laser, and an infrared laser.

21. A high resolution observation apparatus according to claim 19; further comprising a prism having a flat first surface on which the sample is disposed, a second surface onto which the parallel light is irradiated at a total reflection angle, and wherein the probe is disposed proximate a first surface of the sample opposite to a second surface of the sample which is in contact with the prism.

22. A high resolution observation apparatus according to claim 21; wherein the probe is an optical waveguide probe.

23. A high resolution observation apparatus according to claim 22; wherein the probe is formed of an optical fiber having a sharpened tip coated with a metal except at an aperture portion thereof, the aperture portion having a diameter smaller than a wavelength of the laser light.

24. A high resolution observation apparatus according to claim 23; wherein the optical fiber is a single mode optical fiber.

25. A high resolution observation apparatus according to claim 23; wherein the optical fiber is a multimode optical fiber.

26. A high resolution observation apparatus according to claim 23; wherein the evanescent light detector comprises a lens for collecting the evanescent light, and a photodetector for receiving the light collected by the lens and outputting the corresponding signal.

27. A high resolution observation apparatus according to claim 26; further comprising data processing means including a display for producing a three-dimensional image of a detected characteristic of the sample based on outputs of the servo circuit and position control system.

28. A high resolution observation apparatus according to claim 27; further comprising a second light emitting source for irradiating a second incident light through the probe to be incident on the sample, and a light detector for detecting light reflected from the sample in response to the second incident light.

29. A high resolution observation apparatus according to claims 28; wherein the data processing means further comprises means for producing another three-dimensional image of another characteristic of the sample based on an output of the light detector.

30. A high resolution observation apparatus according to claim 29; further comprising a modulator for modulating the incident light and a lock-in amplifier.

31. A high resolution observation apparatus comprising:
an optical device having a surface on which a sample to be observed is disposed;
an optical source for generating an incident light of a predetermined wavelength to be incident to the sample through the optical device at a total reflection angle;
a probe having a sharpened tip for scattering a sample light projected from the sample surface in response to the incident light;
an optical detecting system for detecting the sample light scattered by the probe;
a position control unit for moving one of the probe and the sample in the XY plane to scan the sample over a two-dimensional area to be observed; and
a Z-axis control unit for positioning the probe at a distance from the sample surface in the Z direction close enough to locally scatter sample light projected from a minute region of the sample and for controlling the Z-direction distance between the probe and the sample surface so as to keep a positioning signal detected by the optical detecting system constant during a course of scanning the sample surface over the two-dimensional area to be observed.

32. A high resolution observation apparatus according to claim 31; wherein the optical device is an optical prism made of a transparent material and having a flat surface on which the sample is mounted.

33. A high resolution observation apparatus according to claim 31; wherein the probe is an optical detecting probe comprising an optical fiber having a sharpened tip portion coated with a metal for scattering the sample light and having an aperture at the tip portion at which no metal is coated.

34. A high resolution observation apparatus according to claim 33; wherein the aperture at the tip portion of the probe is smaller in size than a wavelength of the incident light.

35. A high resolution observation apparatus according to claim 31; wherein the incident light is a laser light.

36. A high resolution observation apparatus according to claim 35; wherein the laser light is selected from the group consisting of an argon laser, a semiconductor laser, and an infrared laser.

37. A high resolution observation apparatus according to claim 31; wherein the probe comprises a single mode optical fiber having a sharpened tip coated with metal at the tip thereof except for an aperture portion located at the tip.

38. A high resolution observation apparatus according to claim 31; wherein the incident light comprises an infrared laser, and the optical detecting system comprises a lens for collecting sample light an infrared light detecting element.

39. A high resolution observation apparatus according to claim 31; further comprising means for modulating the incident light periodically and lock-in detecting means.

40. A high resolution observation apparatus according to claim 31; further comprising light detecting means for detecting sample light transmitted through the probe.

41. A high resolution observation apparatus according to claim 31; further comprising a laser light source for transmitting a laser light through the probe tip to irradiate the sample.

42. A high resolution observation apparatus according to claim 41; further comprising light detecting means for detecting light reflected by the sample in response to irradiation by the laser light through the probe tip.

43. A high resolution observation apparatus according to claim 41; further comprising light detecting means for detecting luminescence emitted by the sample in response to irradiation by the laser light through the probe tip.

44. A high resolution observation apparatus according to claim 43; further comprising means for analyzing the spectrum of luminescence emission from the sample.

* * * * *